United States Patent [19]

Stuart

[11] Patent Number: 4,492,420

[45] Date of Patent: Jan. 8, 1985

[54] ELECTRICAL SUPPLY SYSTEMS

[75] Inventor: Robert A. Stuart, Newhaven, England

[73] Assignee: Rotaflex plc, London, England

[21] Appl. No.: 457,057

[22] Filed: Jan. 10, 1983

[30] Foreign Application Priority Data

Jan. 18, 1982 [GB] United Kingdom ................ 8201241

[51] Int. Cl.$^{3}$ ...................... H01R 13/60; B23B 47/28; B23G 1/48

[52] U.S. Cl. ............................ 339/22 R; 408/115 R; 408/241 G

[58] Field of Search .......................... 339/22 R, 22 B; 269/87.3, 294; 408/72 R, 72 B, 115 R, 115 G, 241 R, 241 B, 241 G; 174/71 R, 71 B, 72 R, 72 B, 72 C

[56] References Cited

U.S. PATENT DOCUMENTS

| | | | |
|---|---|---|---|
| 2,267,745 | 12/1941 | O'Brien et al. | 339/22 R X |
| 3,277,234 | 10/1966 | Dekko et al. | 339/126 R X |
| 3,933,403 | 1/1976 | Rubesamen et al. | 339/22 R |
| 4,306,823 | 12/1981 | Nashlund | 408/115 R X |

FOREIGN PATENT DOCUMENTS

| | | | |
|---|---|---|---|
| 1314809 | 4/1973 | United Kingdom | 408/115 R |

*Primary Examiner*—John McQuade
*Assistant Examiner*—Steven C. Bishop
*Attorney, Agent, or Firm*—Arthur Colvin

[57] ABSTRACT

To connect electrical supply leads (19) to an electrical distribution track (1-6) a hole (16) is formed in a rear wall (2) by drilling a series of intersecting holes using a guide block (7) engageable in the track channel and including a locking plate (19) to secure it therein, inserting an insulating bushing (8) into the hole (16) and feeding the supply connectors (19) through the bushing for connection to a supply connector (21) which is inserted into the track through the channel mouth.

5 Claims, 2 Drawing Figures

ELECTRICAL SUPPLY SYSTEMS

Figure 1:
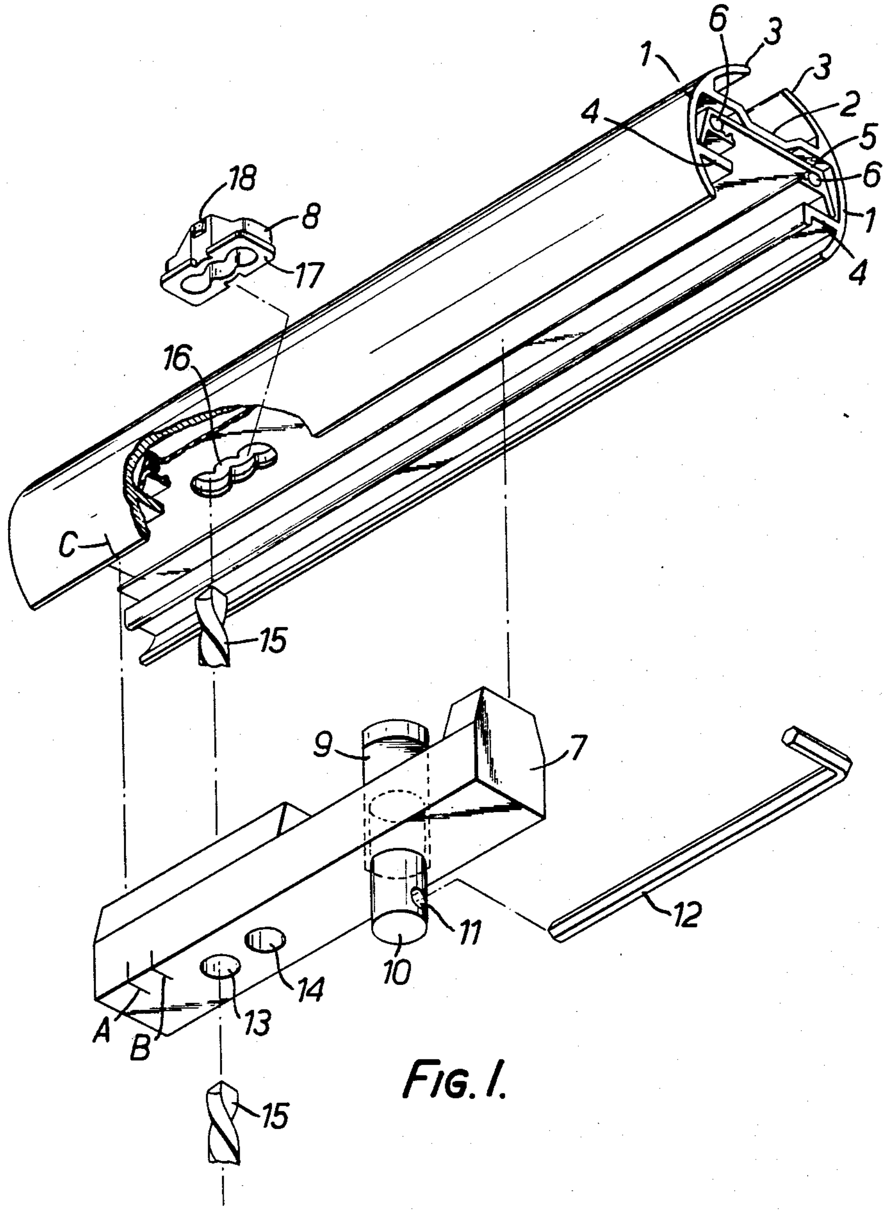

This invention relates to electrical supply systems of the kind comprising a supply track in the form of an elongate channel housing a plurality of conductors extending longitudinally of the channel, a supply connector including terminals for attachment of electrical supply leads and contacts connected electrically to the terminals and arranged to contact the conductors of the track when the connector is engaged in the track channel, and one or more adaptors engageable in the track through the open mouth of the channel at any selected position along its length and including contacts engageable with the conductors for supplying electric power to an electrical appliance wired to the adaptor.

In the majority of such electrical supply systems currently available on the market, the supply connectors are adapted to be fitted to an end of the track by pushing the connector into the open end of the channel. It is necessary therefore to allow sufficient space at the end of the track during installation to enable the supply connector to be fitted, and the track cannot extend right up to a wall which can be a disadvantage from an aesthetic point of view. Furthermore, the electrical supply may not be conveniently located adjacent the track end so that the cable must run along the track to the connector.

In an attempt to remove or obviate these drawbacks we have proposed a supply connector which can be fitted at any position along the track by insertion through the channel mouth. However, as the inner end wall of the channel opposite the mouth is usually continuous without apertures or interruptions, difficulty can be experienced in feeding the supply cable leads to the connector.

The present invention seeks to overcome this difficulty and accordingly provides a method of connecting electrical supply leads to an electrical distribution track characterised by the steps of forming a hole in the rear wall of the channel located opposite the channel mouth, inserting an electrically insulating bushing into the hole, feeding the supply leads through the bushing, and inserting the supply connector into track through the channel mouth after connection of the supply leads thereto.

For reasons of convenience the hole is preferably a slot provided by drilling a plurality of intersecting holes, and to facilitate the drilling operation a guide device can be provided, the device being engageable in the track channel and having means to secure it in the track and having one or more through holes to guide the drill bit for forming the slot.

The invention also provides in combination with an electrical supply track, a wiring kit for use in connecting supply leads to the track by the above method and characterised in that said kit includes a drilling guide having releasable means to secure the guide to the track adjacent the rear wall of the channel at any adjusted position along the track, at least one hole in the guide for guiding a drill bit to form an opening of predetermined shape in said rear wall, and a bushing of electrically insulating material adapted to fit in said opening for protecting the supply leads passed therethrough.

In a preferred embodiment the guide comprises a member insertable in the track channel through the mouth and including a locking element engagable with an internal flange of the channel to lock the member releasably in the channel. At least two holes may be provided in the member to allow a plurality of intersecting holes to be drilled to define an opening of predetermined shape, preferably a slot extending along the track.

Figure 2:
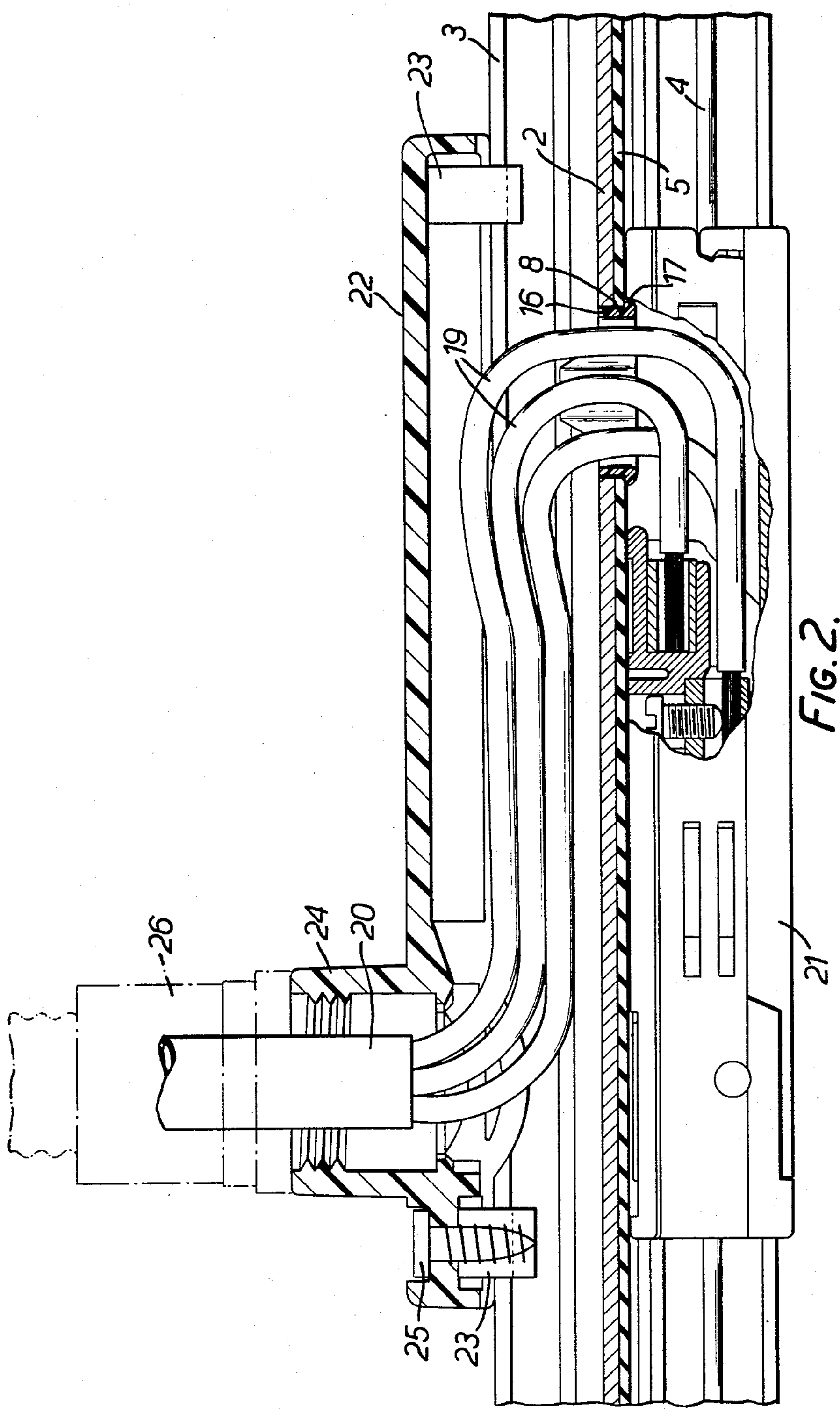

A full understanding of the invention will be had from the following detailed description given with reference to the accompanying drawings, in which:

FIG. 1 is an exploded perspective view showing components of a kit embodying the invention; and FIG. 2 is a longitudinal section through a section of electrical supply track in which electrical supply leads have been fed to a supply conductor using the kit and method of the invention.

In FIG. 1 there is shown a length of electrical current supply track comprising a channel section with arcuate sides 1 interconnected by a rear end wall 2 opposite the channel mouth, and extending rearwardly beyond the wall 2 to define a pair of upper flanges 3. A pair of opposed lateral flanges 4 are located a short distance inside the channel mouth and act as supports for an electrically insulating insert 5 which carries the track conductors 6 and has a central portion which abuts against the wall 3.

To enable the leads of an electrical supply cable to pass into the track channel from the rear of the track there is provided a kit which includes a guide member 7 and an electrically insulating bushing 8. The member 7 consists of a block shaped and dimensioned to fit in the channel mouth and a locking plate 9 the opposite ends of which can be brought, by rotation of a pin 10 carrying the plate, to engage behind the flanges 4 to secure and lock the block in the track. The head of pin 10 has a transverse hole 11 to receive a tommy bar 12. Extending through and spaced apart along the block 7 are two guide holes 13, 14 having a diameter to receive with a small guiding clearance a drill bit 15 of predetermined size. To allow three intersecting holes to be drilled to provide an opening or slot 16 of predetermined shape to be formed in the track wall 2 and insert 5, a pair of registration marks, e.g. grooves A, B, are provided in the block.

To form the slot 16 the guide block is inserted into the track channel at the appropriate position with the ends of the locking plate 9 retracted. The pin 10 is then turned by means of the tommy bar 12 to secure the block in position. A mark C is made on the track in alignment with registration mark A, preferably with a pencil. Two holes are then drilled through the track wall 2 and insert 5 by passing the bit 15 through the two holes 13, 14 in turn. The guide block is then unlocked and its position along the track adjusted to bring mark B into register with mark C. After locking the block in position again a third hole is then drilled by passing the bit through hole 14 for a second time. The slot 16 is now finished and block 7 can be removed from the track.

The bushing 8 is moulded from plastics material and is shaped to be a close fit in the slot 16. An external peripheral lip 17 is provided at one end and a pair of wedge shaped locking pips 18 are formed on opposite sides of the bushing at a distance from the lip 17 substantially equal to the combined thickness of the track wall 2 and insert 5. The bushing 8 is inserted into the slot 16 through the track mouth until the lip 17 abuts the outer face of insert 5 and the pips 18 snap behind the rear face of the wall 3 to retain the bushing securely in position. The leads 19 (FIG. 2) of the supply cable 20 are then passed down through the aperture running through the bushing 8, and are wired to an appropriate supply connector 21 adapted to fit within the track, as shown in FIG. 2, for supplying electric current to the track conductors. The bushing 8 protects the insulation of the cable leads 18 against the sharp edges of the slot 16 as well as providing additional electrical insulation between the cable conductors and the track.

When the supply connector 21 is pushed up into the track channel after wiring, it is almost inevitable that at least a small length of the leads 19 will be pushed back through the bushing 8 and some slack will occur at the rear of the track. In order to conceal the leads and afford extra insulation for the portions thereof which are stripped of the main cable insulation, a cover 22 may be fitted to the rear of the track. The cover is a channel shaped plastics moulding with closed ends, a pair of legs 23 adjacent each end arranged to fit between and snap resiliently behind the rear flanges 3 of the track, and an upwardly projecting tubular boss 24 for entry of the cable 20. A self-tapping screw 25 is inserted between one pair of legs 23 to hold them in firm locking engagement with the track and prevent the cover becoming dislodged accidentally. The boss 24 is shown with an internal screw thread in which is engaged a flexible connector 26 for connection to a cable ducting. The cover 21 ensures a neat appearance by concealing the cable leads 19 and improves safety by providing a double insulation for these leads.

What is claimed is:

1. In combination a wiring kit and electrical distribution track, said track including a channel having a mouth and a rear wall opposite the mouth, said channel including a plurality of conductors housed in the channel and extending longitudinally thereof, said kit comprising guide means insertable through said mouth into contact with said rear wall, releasable means on said guide means for securing said guide means to said channel at a selected, adjusted position along said track, at least two holes formed in said guide means for guiding a drill bit inserted through said holes toward said rear wall to form openings of predetermined shape in said rear wall, said holes being spaced to enable a series of intersecting openings to be drilled in said rear wall to define a slot shaped opening, and a bushing of electrically insulating material adapted to fit in said opening for protecting supply leads passed therethrough.

2. An apparatus in accordance with claim 1 wherein the kit includes a cover of electrically insulating material including means for attaching said cover to the track on the side of the rear wall remote from the channel mouth for concealing supply leads protruding through said rear wall.

3. In combination a wiring kit and electrical distribution track, said track including a channel having a mouth and a rear wall opposite the mouth, said channel including a plurality of conductors housed in the channel and extending longitudinally thereof, said kit comprising guide means insertable through said mouth into contact with said rear wall, releasable means on said guide means for securing said guide means to said channel at a selected, adjusted position along said track, at least two holes formed in said guide means for guiding a drill bit inserted through said holes toward said rear wall to form openings of predetermined shape in said rear wall, said holes being spaced to enable a series of intersecting openings to be drilled in said rear wall to define a slot shaped opening, registration means on said guide means for adjusting the position of said guide means in predetermined manner along said track, and a bushing of electrically insulating material adapted to fit in said opening for protecting supply leads passed there-through.

4. An apparatus according to claim 3, wherein the track channel includes an internal flange and the releasable securing means comprises a locking element adjustable to engage said flange to secure the guide member in the channel.

5. An apparatus according to claim 3, wherein the kit includes a cover of electrically insulating material including means for attaching said cover to the track on the side of the rear wall remote from the channel mouth for concealing supply leads protruding through said rear wall.

* * * * *